United States Patent
Neuberth et al.

(10) Patent No.: US 10,228,028 B2
(45) Date of Patent: Mar. 12, 2019

(54) METHOD FOR REDUCING CHATTER VIBRATIONS IN A FRICTION CLUTCH IN A DRIVE TRAIN OF A MOTOR VEHICLE

(71) Applicant: Schaeffler Technologies AG & Co. KG, Herzogenaurach (DE)

(72) Inventors: Ulrich Neuberth, Otigheim (DE); Florian Eppler, Karlsruhe (DE); Daniel Muller, Oberkirch (DE); Michael Reuschel, Ottersweier (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 143 days.

(21) Appl. No.: 15/300,043

(22) PCT Filed: Mar. 26, 2015

(86) PCT No.: PCT/DE2015/200197
§ 371 (c)(1),
(2) Date: Sep. 28, 2016

(87) PCT Pub. No.: WO2015/158344
PCT Pub. Date: Oct. 22, 2015

(65) Prior Publication Data
US 2017/0138419 A1 May 18, 2017

(30) Foreign Application Priority Data

Apr. 16, 2014 (DE) .......................... 10 2014 207 310
Apr. 16, 2014 (DE) .......................... 10 2014 207 354
(Continued)

(51) Int. Cl.
*B60W 30/20* (2006.01)
*F16D 48/06* (2006.01)

(52) U.S. Cl.
CPC ........ *F16D 48/06* (2013.01); *F16D 2500/102* (2013.01); *F16D 2500/1045* (2013.01);
(Continued)

(58) Field of Classification Search
CPC .............. F16D 2500/50293; B60W 2030/203
See application file for complete search history.

(56) References Cited

U.S. PATENT DOCUMENTS 5,620,390 A * 4/1997 Kono .................... F16H 61/143
192/3.31
9,518,624 B2 * 12/2016 Neuberth ................ F16D 48/06
(Continued)

FOREIGN PATENT DOCUMENTS

DE 102006014072 10/2007
DE 102010042625 4/2012
(Continued)

*Primary Examiner* — Tisha D Lewis
(74) *Attorney, Agent, or Firm* — Volpe and Koenig, P.C.

(57) ABSTRACT

A method is disclosed for reducing chatter vibrations of a friction clutch controlled automatically by a clutch actuator on the basis of a target clutch torque (M(s)) assigned to a clutch torque which is to be transmitted. The friction clutch is positioned in a drivetrain between an internal combustion engine and a transmission, having a present actual clutch torque which is marked by vibrations as a result of vibrations (M(i)). From a transmission behavior of the present actual clutch torque (M(i)), an absolute amplitude and a phase of an input signal detected at the output of the friction clutch and conveyed to a regulator are ascertained, and a phase-selective disturbance torque is ascertained. From the phase-selective disturbance torque, a phase-correct correction torque (M(k)) is determined, and the target clutch torque (M(s)) is corrected by the regulator. The correction torque (M(k)) is weighted with a specifiable intensification factor.

10 Claims, 2 Drawing Sheets

(30) Foreign Application Priority Data

| Apr. 16, 2014 | (DE) | 10 2014 207 361 |
| Apr. 25, 2014 | (DE) | 10 2014 207 833 |
| Jul. 15, 2014 | (DE) | 10 2014 213 703 |
| Jul. 17, 2014 | (DE) | 10 2014 213 925 |
| Jul. 17, 2014 | (DE) | 10 2014 213 927 |
| Jul. 22, 2014 | (DE) | 10 2014 214 196 |

(52) U.S. Cl.
CPC ............ *F16D 2500/10412* (2013.01); *F16D 2500/304* (2013.01); *F16D 2500/306* (2013.01); *F16D 2500/308* (2013.01); *F16D 2500/3042* (2013.01); *F16D 2500/30426* (2013.01); *F16D 2500/30806* (2013.01); *F16D 2500/30816* (2013.01); *F16D 2500/3107* (2013.01); *F16D 2500/3125* (2013.01); *F16D 2500/3127* (2013.01); *F16D 2500/3163* (2013.01); *F16D 2500/3168* (2013.01); *F16D 2500/50287* (2013.01); *F16D 2500/50293* (2013.01); *F16D 2500/708* (2013.01); *F16D 2500/7044* (2013.01); *F16D 2500/7061* (2013.01); *F16D 2500/7082* (2013.01); *F16D 2500/70605* (2013.01); *F16D 2500/70668* (2013.01); *F16D 2500/70673* (2013.01); *F16D 2500/7109* (2013.01)

(56) References Cited

U.S. PATENT DOCUMENTS

| 2004/0186645 | A1* | 9/2004 | Kohno | B60T 1/062 701/51 |
| 2004/0260444 | A1* | 12/2004 | Winkelmann | F16D 48/06 701/67 |
| 2005/0189192 | A1* | 9/2005 | Serebrennikov | B60W 30/20 192/30 V |
| 2008/0091324 | A1 | 4/2008 | Werner et al. | |
| 2010/0185373 | A1* | 7/2010 | Herter | B60W 30/20 701/67 |
| 2015/0060230 | A1 | 3/2015 | Neuberth et al. | |

FOREIGN PATENT DOCUMENTS

| DE | 102012217132 | 4/2013 |
| DE | 102013204698 | 10/2013 |
| WO | 03019029 | 3/2003 |

\* cited by examiner

METHOD FOR REDUCING CHATTER VIBRATIONS IN A FRICTION CLUTCH IN A DRIVE TRAIN OF A MOTOR VEHICLE

BACKGROUND

The invention relates to a method for reducing chatter vibrations of a friction clutch controlled automatically by a clutch actuator on the basis of a target clutch torque assigned to a clutch torque which is to be transmitted, which clutch is positioned in a drivetrain of a motor vehicle between an internal combustion engine and a transmission, having a present actual clutch torque which is marked by vibrations as a result of chatter vibrations which occur occasionally. Automated friction clutches in a drivetrain of a motor vehicle between an internal combustion engine and a transmission have long been known. Here, instead of the foot of a driver, a clutch actuator controlled by a clutch device moves an actuating element, for example a clutch lever, a diaphragm spring, a lever spring or the like, along an actuation path. Assigned to the actuation path is a torque characteristic curve which is adaptable, for example, to external conditions such as clutch temperature, the frictional properties of the clutch linings, operation time and the like, and which may be calibrated by means of a contact point on the actuation path. For example, depending on the operatingsituation of the friction clutch desired by the driver or resulting from a transmission controller, a target clutch torque or a value connected therewith is ascertained by a control unit and issued as a control bariable to adjust an actuation path of the clutch actuator corresponding to teh target clutch torque. Depending on the design of the clutch actustor, when the clutch actuator is driven electrically this variable may be an electrical variable such as boltage, current or pulse width of a supply voltage, or a pressure, a volume flow or the like in the case of a hydraulically or pneumatically operated clutch actuator. The adjustment of the actuation path may be monitored or regulated by means of relative and/pr absolute distance sensors.

In friction clutches of this sort, due to the geometric properties and manufacturing tolerances not corresponding to the ideal state, for example angle and axis offsets between the friction elements of the friction clutch resulting in uneven frictional engagement, so-called chatter vibrations may occur, in which case a disturbance clutch torque having a predetermined amplitude and frequency is superimposed on the clutch torque adjusted on the basis of the predetermined target clutch torque, which may result in disruptions of comfort of the motor vehicle and increased wear. To reduce such chatter vibrations, a method is known, for example from DE 10 2012 217 132 A1, in which the frequency, amplitude and phase of a vibration superimposed on the transmission input signal is ascertained. In this method, depending on the frequency ascertained, an amplified and phase-shifted signal of the same frequency is generated and modulated as a control signal onto the target clutch torque, in order to eliminate oscillations of the transmission input signal. When multiple frequency components occur with comparable amplitude in the ascertained range, this compensation can result in behavior that is difficult to track. If, in addition, a phase jump occurs in the transmission input signal, frequency is difficult to determine; the same is true in the case of greatly changing amplitude or frequency, since modulations of amplitude, phase and frequency are interconnected.

In DE 10 2013 204 698 A1 a method is disclosed for damping drivetrain vibrations in a general form by eliminating a resonant frequency. This method provides only a limited possibility of reducing the chatter vibrations due to geometry. It is true that known excitation frequencies can be varied by adjusting filter parameters in order to perform an optimization for this excitation, but other excitation frequencies can be intensified thereby; for example, a chattering caused by geometry in a different frequency may be promoted.

From unpublished German patent application no. 10 2013 206 446.2 a method is known for reducing chatter vibrations of a friction clutch positioned in a drivetrain of a motor vehicle between an internal combustion engine and a transmission, which is controlled automatically by a clutch actuator on the basis of target clutch torque assigned to a clutch torque that is to be transmitted. In this case, chatter vibrations overlying a present actual clutch torque are corrected by ascertaining from a transmission behavior of the present actual clutch torque an amplitude and a phase of an input signal obtained at the output of the friction clutch and conveyed to a regulator, ascertaining from these parameters a phase-selective disturbance torque, ascertaining from the latter a phase-correct correction torque, and with this correcting the target clutch torque by means of a regulator which regulates the present actual clutch torque using the correction torque.

SUMMARY

The object of the invention is to further refine such a method beneficially.

The object is fulfilled by the features of the method according to the invention.

The proposed method serves to reduce chatter vibrations of a friction clutch controlled automatically by a clutch actuator on the basis of a target clutch torque assigned to a clutch torque which is to be transmitted, which clutch is positioned in a drivetrain of a motor vehicle between an internal combustion engine and a transmission, having a present actual clutch torque which is marked by vibrations as a result of vibrations which occur occasionally. The chatter vibrations are detected by ascertaining from a transmission behavior of the present actual clutch torque an absolute amplitude and a phase of an input signal registered at the output of the friction clutch. To this end, a lock-in regulator may be used which regulates the phase-selective variables amplitude and phase position obtained from the input signal, for example a transmission input speed, a longitudinal acceleration of the motor vehicle or the like. The regulator, and possibly filters and/or computing units inserted upstream or downstream, determine from these variables a phase-selective torque and an appropriately correlating phase-correct correction torque. Using this correction torque, the present actual clutch torque is corrected by the regulator feeding the correction torque into the target clutch torque. As this is carried out, to adapt the correction torque to the vibration-marked input signal, and its phase position and amplitude to the ascertained disturbance torque and the like, the correction torque is weighted in particular phase-selectively by means of a definable intensification factor.

In this way, it is possible, for example, to specify by means of the intensification factor how much of the vibration amplitude ascertained and identified from the input signal is compensated for. The specification of the size of the intensification factor may serve in this case for selective fade-out/shut-off in critical or non-controllable situations in which a stable mode of operation of the regulator is expected, for example as a result of an unstable input signal.

Stable or appropriate anti-chatter control to prevent or damp chatter vibrations is not beneficial in every operating state. For example, anti-chatter control is only available with a slipping friction clutch, since chatter vibrations typically occur only in this operating state, since the clutch torque that is transmissible by the friction clutch also depends exclusively in this operating state on the clutch torque actually transmitted. Furthermore, operating states occur in which the drivetrain behavior is known only inadequately, and thus the input signal cannot be ascertained in such a way that a stable mode of operation of the regulator can be expected.

The intensification factor may be specified dependent on at least one value that is present within the method. An advantageous embodiment of the method provides, for example, an anti-chatter strategy in which, for example, a linear-operating regulator in the form of a parameterizable software damper and a lock-in regulator are combined. In this case, an effective frequency response of the system, which may be formed, for example, from the clutch control, the clutch actuator with the actuating mechanism, the friction clutch and the attached drivetrain, which presents a load that can vibrate, is incorporated into the lock-in regulator while a software damper is active. Since, in this case, the frequency response stored in the lock-in regulator, which is the inverse for example of the disturbance, is only sufficiently known when a software damper is active, the lock-in regulator is faded out together with the latter by means of a situation-dependent overall intensification. This occurs in the form of a limitation of an intensification factor which is specific to the lock-in regulator to this overall intensification.

This intensification factor can be made dependent on internal parameters and values, that is, ones which are handled within the method. For example, a characteristic map with appropriate weighting of the intensification factor may be specified, which is dependent on an identified amplitude and a reference frequency of the lock-in regulator. Furthermore, operating states may occur which are attributable to internal values and parameters of the method, at which, advantageously, the lock-in regulator is shut off or the intensification factor is reduced. For example, the intensification factor may be specified dependent on the reference frequency, since for low and high frequencies the frequency response is insufficiently known. For example, at low frequencies within typical chatter frequencies reciprocal effects with the rest of the driving strategy may occur; at high frequencies above the typical chatter frequencies the phase precision and dynamics of the clutch system may be insufficiently predictable and therefore poorly predictable.

Furthermore, a dependency of the intensification factor on the identified vibration amplitude may be ascertained and possibly taken into account. For example, at small amplitudes the intensification factor may possibly be reduced down to zero (no effect of the regulator), since the clutch actuator with its positioning system may possibly not be able to be regulated precisely enough due to deficient resolution, hysteresis and the like.

Furthermore, because of the scarcely perceptible disturbance at small amplitudes such as interference amplitudes, regulation can be dispensed with, since these may not be perceivable at all to the driver or occupants of the motor vehicle. At appropriately high amplitudes, the regulator may for example be shut off or the intensification factor may be reduced to zero, since an assumed linear behavior is no longer assured and the friction clutch may have a defect.

According to another advantageous embodiment of the method, the intensification factor can be specified dependent on a value defined outside of the method, for example moderated or set to zero. For example, the intensification factor may be limited by a superordinate strategy, for example a superordinate control device. In this respect, the method may have an interface into which other control programs of the motor vehicle may intervene. For example, such accesses may be made by the manufacturer of the motor vehicle in order to gain access to the procedure. The access may, for example, contain operating states, such as for example an initial start-up at the end of the line (EOL) or the like.

Alternatively or in addition to a limitation of the correction torque by means of an intensification factor, the input signal may be checked with regard to its regulating quality, and if quality is lacking the regulator may be reset to its original state. At the same time, if input signals are unusable, the regulator may be re-initialized. For example, the identification of chatter vibrations may have a form of memory, depending on the regulator, and may be based on the filtering of continuous signals. If the quality of the input signal is below a specified quality threshold, for example due to a limited signal acquisition rate of sensors, interference on the input signal and the like, the regulation of the chatter vibrations may be faded out by shutting off the regulator and deleting its memory for example in the form of integrative components, filter contents and the like.

In one preferred embodiment of the method, a determination of vibration components of the input signal is made, equidistant in a phase space of a reference frequency. This enables the regulator to be formed while protecting the process resources that constitute the regulator. A determination of frequency components involves a relatively high volume of computing. For example, computation-intense trigonometric functions, averaging over a buffer and the like may become necessary. It is proposed therefore that vectors be provided for the regulation that are calculated in accordance with a complex Fourier component for the fundamental frequency of a so-called discrete Fourier transformation. The fundamental frequency in this case is changeable over time, and may be specified by a reference frequency, for example the speed of rotation of the combustion engine of the drivetrain, the transmission input speed or the slip speed between the speed of the crankshaft and the transmission input speed. In this case, the input signal, for example the transmission input speed, may be assigned to a continuous phase that is found through integration, for example summation, of the reference frequency over the time. At the same time, a determination of sufficient and consistent quality may be obtained by making this assignment in the form of a rescanning of the corresponding input signals at times that correspond to the equidistant phase steps. 8 scan points per period, for example, have proven advantageous, for example as $\pi/4$ steps. The Fourier components are determined in the form of two sums:

$$\begin{cases} N_{real} = c * \sum_{k=D}^{7} \left[ \cos\left(k * \frac{\pi}{4} + \varphi_{ref}\right) * n_k \right] \\ N_{imag} = c * \sum_{k=D}^{7} \left[ \cos\left(k * \frac{\pi}{4} + \varphi_{ref} + \frac{\pi}{2}\right) * n_k \right] \end{cases}$$

with $$\varphi_{ref} = l * \frac{\pi}{4},$$

whole number l, the standardization factor c and the buffer over the 8 last re-scanned input signals $n_k$. It should be noted here that in this case $$\cos\left(x+\frac{\pi}{2}\right) = -\sin(x),$$

so that a calculation of trigonometric functions is thus limited to 8 control points of the cosine function, which can be converted very efficiently by means of a table of values. Furthermore, a recalculation of the sums at each scanning step can be omitted, since only their boundary values differ; that is, only the oldest value is subtracted from the last sum and the newest value is added, in the sense of a moving average. Furthermore, the addends have the same prefactor, due to the periodic cosine function.

Vibration vectors may be depicted in the form of vectors having an amplitude and a phase position in relation to the phase space, and the disturbance torque may be ascertained on the basis of these. The vibration components are handled in this case in the form of vectors which depict the amplitude and phase position in relation to the reference frequency. An interpretation as complex numbers also makes it possible to depict amplitude and phase compensations or as pre-control elements in the sense of corresponding vectors, for example rotation and distance vectors. Since a vibration component belonging to a reference frequency is expressed in the form of a vector, calculation yields simple options of manipulation to compensate for or pre-control typical influences. Description in the form of complex numbers is beneficial: a transformation in the form of an intensification A and a phase shift $\varphi$ can be expressed by the complex number $$z = A \cdot \cos(\varphi) + i \cdot A \cdot \sin(\varphi)$$

where, conveniently, it is not the amplitude and phase that are used for a transformation, but the real and imaginary parts directly. The transformation of a certain vector in complex depiction then means a complex multiplication using the transformation vector. This procedure may correspond, for example, to the use of vectors and matrices, where the transformation matrices consist only of two independent components.

According to an advantageous version of the method, it is possible to ascertain from the target clutch torque and the present actual clutch torque a frequency response function of a changing transmission behavior, and with changing transmission behavior to provide a pre-control of the correction torque that depends thereon. To this end, a beneficial pre-control may relate to the compensation of the changeable transmission behavior of an actuator subsystem, for example the position controller of the clutch actuator with frequency change.

In this case, the lock-in regulator identifies a vibration vector for the target clutch torque on the basis of a vibration vector for example of the transmission input speed, the stored frequency response and the closed regulating circuit. The regulator is based on the assumption that a sufficiently (phase-)stable geometric disturbance exists on the present actual clutch torque. A relationship is assumed, in this case, between the target clutch torque and the present actual clutch torque, which can be expressed approximately by a frequency response function. This frequency response function is determined when the reference frequency is changed, in which case a transformation vector is calculated which represents the expected change to the identified target torque vector as a pre-control when the frequency changes. It has proven beneficial to store the transformation vector in the form of a fixed vector which is multiplied by the for example filtered derivative of the reference frequency. In the case of a dual clutch, the fixed vector is determined and stored in a preferred manner separately for each of the two friction clutches. Alternatively, the fixed vector may be adjusted to various controller settings of the clutch position controller.

According to another embodiment, a phase shift dependent on detection of the input signal by a sensor can be corrected. In this case, a compensation or correction of typical time delays of the input signal, which arises when a speed of rotation is registered by detecting the time difference for example between two gear teeth, is compensated for. For example, such a time difference may arise due to the typical design of a rotational speed sensor in the form of a Hall effect sensor, which detects passing teeth of a gear wheel and uses their time difference to determine a speed of rotation. In this case, the measured speed signal receives a time shift relative to the physical speed of rotation which is inversely proportional to the speed of rotation. This results in a phase shift in the effective frequency response of the regulator, which is proportional to the observed frequency for a particular speed of rotation. This detectable relationship of the phase shift is used in an advantageous manner to correct the stored frequency response function. To this end, the phase shift is determined at a specified speed, and is converted to the other occurring speeds. In order to calculate this correction efficiently without employing trigonometric functions, the calculation function is linearized so as to obtain a central reference frequency $n_D[rpm]$. The analytically calculated correction vector results from this according to:

$$\begin{pmatrix} \cos(\varphi_n) \\ \sin(\varphi_n) \end{pmatrix}$$

with $$\varphi_n[\text{rad}] = \frac{2*\pi}{60} * (n_{ref}[rpm] * \Delta t_n[s]),$$

with the present reference frequency $n_{ref}$ and $$\Delta t = \frac{60}{n_{lps}[rpm]*N_z} - \frac{60}{n_D[rpm]*N_z},$$

with the present speed $n_{lps}$ and the tooth count $N_Z$ on the gear wheel. By correcting the stored frequency response to the reference frequency, or determining it to be the reference frequency, the correction vector can be well approximated by the amount of this reference frequency:

$$\begin{pmatrix} \cos(\varphi_n) \\ \sin(\varphi_n) \end{pmatrix} \cong \begin{pmatrix} 1 \\ \varphi_n \end{pmatrix}.$$

To obtain a balanced error between, for example, 200 rpm and very high speeds, the reference frequency may be provided in the effective middle of the reciprocal value, for example at 400 rpm.

According to another advantageous embodiment, the regulator is designed as an integral regulator and the correction torque is formed as a composite signal from an already issued phase-selective correction torque and a residual torque currently obtained from the input signal. For example, an integral regulator in the form of a PT1 filtration of a composite signal is provided, formed from the vector of the correction torque already modulated by the regulator and the vibration identified from the remaining rotational speed and the residual torque determined therefrom. In this case, an integral regulator may be designed in such a way that a deviation from the goal of the target clutch torque to be corrected with a specified weighting to the already issued regulating signal is added as a correction torque. In the case of a lock-in regulator, this procedure may be applied to the issued vibration vector. Alternatively, the sum of the already issued signal and a still present residual vibration vector may be formed, and filtered by means of a PT1 filtration. In an advantageous manner, without additional computing effort a filtered vector can be gained thereby for the identified vibration, in case the entire ascertained correction torque is not to be modulated to the target clutch torque because of a specified intensification factor smaller than one. For example, at small identified amplitudes this embodiment can reduce the intensification factor itself.

For phase-correct modulation of the composite signal to the target clutch torque, the phase-selective correction torque can be formed opposite the residual torque phase-selectively by means of a time delay. In this case the vibration vector of the already modulated correction torque is delayed, in order to compensate for the delay in identifying the residual torque. When obtaining the sum of the already issued vibration vector and the residual vibration vector, care is taken to ensure that the summation is phase-correct. To this end, for example, the residual vibration vector is obtained by averaging over the last period of the reference frequency, and is delayed relative to the currently issued vibration vector by an appropriate phase angle. In an advantageous manner, this occurs by means of an identical averaging, or for example by means of a simple delay by the length of half a cycle.

BRIEF DESCRIPTION OF THE DRAWINGS

The invention will be explained in further detail on the basis of the exemplary embodiment depicted in FIGS. 1 through 3. The figures show the following.

DETAILED DESCRIPTION OF THE PREFERRED EMBODIMENTS

Figure 1:
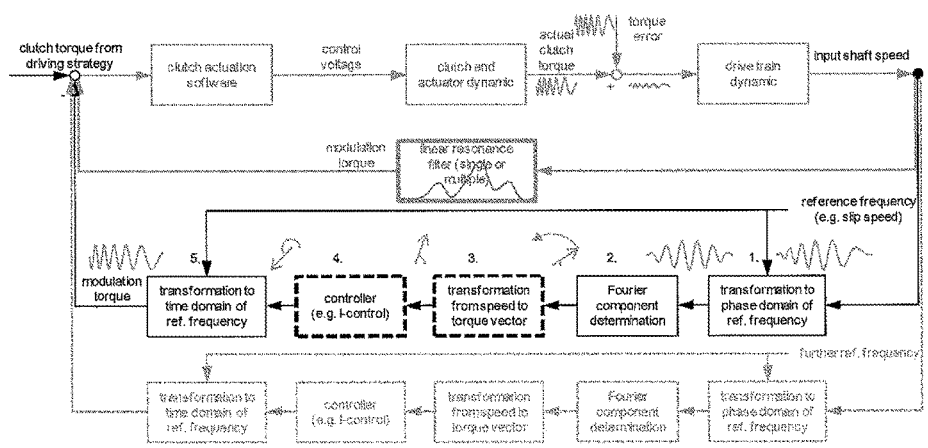
FIG. 1 a block diagram of the execution of the proposed method.

FIG. 1 shows the block diagram 1 of the controlling of a friction clutch. Here, a target clutch torque M(s) is fed in from a driving strategy, and in the clutch control 2 in a position controller the distance signal, for example in the form of the control voltage V(c), is issued to the clutch actuator with the friction clutch 3. The friction clutch 3 transmits an established present actual clutch torque M(i) and is overlaid by the disturbance torque M(e), which is generated, for example, by geometric clutch errors and the like. The position controller of the friction clutch 3 is continuously readjusted by means of the disturbance torque M(e). From this results the transmission input speed n(g) at the transmission input 4. Because of the chatter behavior of the friction clutch 3, chatter vibrations develop depending on the speed of rotation and depending on the dynamic behavior of the drivetrain and the like, for example in driving-off and creeping processes and when engaging the clutch after a shifting process in the transmission; these chatter vibrations are corrected by means of the regulator 5. To this end, the chatter vibrations are identified at the transmission input by means of the regulator 5, for example a lock-in regulator, and converted to a phase-selective input torque M(k), with which the target clutch torque M(s) is corrected at the junction point 6, whereby the chatter vibrations are at least damped.

In block 7, depending on the reference frequency $f_{ref}$, which is fed in, for example, as a slip frequency of the friction clutch 3, as the transmission input speed n(g), as the speed of the combustion engine or the like, the regulator 5 converts the identified vibration component into the phase domain. In block 8, the Fourier components of the vibration components are determined. This is followed in block 9 by a conversion of the vibration components into torque components. The regulation of the torque components occurs in block 10 in the form of an integral control unit. Block 11 contains the phase position of the torque components on the basis of the reference frequency $f_{ref}$, and output of the phase-selective correction torque M(k).

Figure 2:
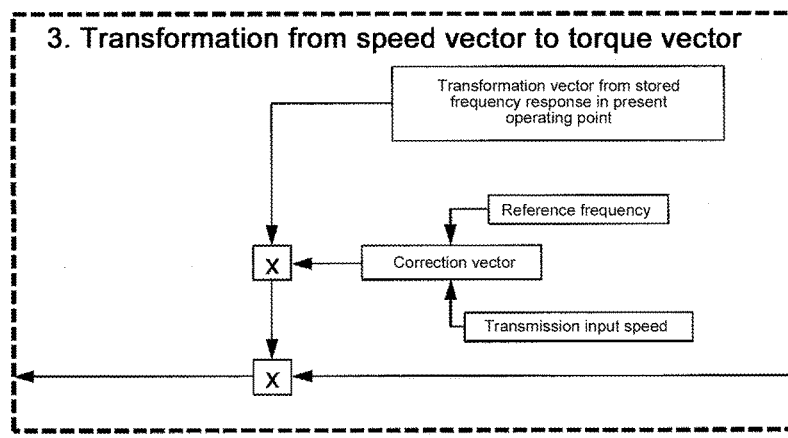
FIG. 2 a detail of the block diagram of FIG. 1 with a transformation of a rotational speed vector into a torque vector, and FIG. 3 a detail of the block diagram of FIG. 1 with a compensation for phase differences.

FIG. 2 shows block 9 of FIG. 1 in detail. In block 9, rotational speed vector $Z_d$ is transformed into torque vector $Z_m$. A phase shift of the rotational speed vector $Z_d$ caused, for example, by a rotational speed sensor is corrected here. In this case, the transformation vector $Z_t$ from the stored, for example saved frequency response is corrected at the junction point 13 by means of the correction vector $Z_k$ formed from the reference frequency $f_{ref}$ and the transmission input speed n(g). The transformation vector $Z_t$ transforms the rotational speed vector $Z_d$ into the torque vector $Z_m$ at the junction point 14.

Figure 3:
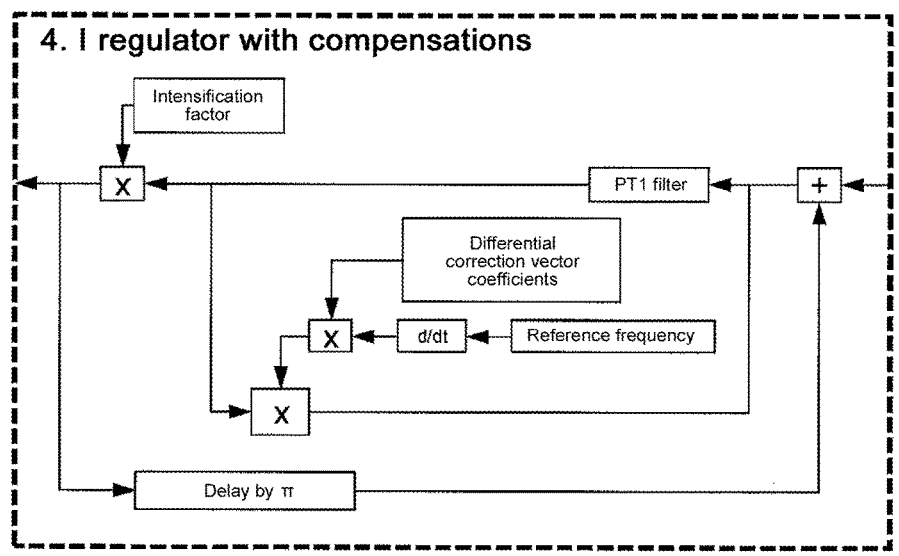

FIG. 3 shows block 10 of FIG. 1 in detail. The torque vector $Z_m$, already corrected in block 9 with regard to a phase shift by the rotational speed sensor, is fed into block 10, which serves as an integral control unit. The torque vector $Z_m$ is reduced by the PT1 filter 15 to the filtered output $Z_{m1}$. The filtered output signal $Z_{m1}$ represents as it were the memory of the filter. New values are weighted and added to the previous filter value in each execution step, and then fed into the input of the PT1 filter 15. To this end, the filtered output signal $Z_{m1}$ is multiplied by the correction vector $Z_s$ in a control loop at the junction point 16. The correction vector $Z_s$ is formed in junction point 19 from differential correction vector coefficients provided in block 17 and a reference frequency differentiated by time in block 18, and is fed in ahead of the PT1 filter 15. Prior to the output of the output signal $Z_{m1}$ filtered by means of the vector and of correction vector $Z_s$ of the phase-selective correction torque M(k) from block 10, block 12 is provided for weighting the correction torque M(k). The correction torque M(k) can be weighted here in block 10 depending on external or internal parameters and values, in order to limit a negative influence of the regulator 5 on the target clutch torque M(s) (FIG. 1), for example in the case of an uncertain input signal in the form of the transmission input speed n(g) (FIG. 1) or the like and/or in the case of a desired intervention from outside, or to shut off the regulator 5. In order to synchronize the correction torque M(k) and the phase-corrected torque vector $Z_p$ formed from the filtered output signal $Z_{m1}$ and the correction vector $Z_s$ with each other into the exact phase position, in block 20 the correction torque M(k) is delayed. The delay is half a cycle of the reference frequency $f_{ref}$, with a time lag of the rotational speed sensor produced by a moving average in the Fourier component determination being compensated for here.

REFERENCE LABELS 1 block diagram
2 clutch control
3 friction clutch
4 transmission input
5 regulator
6 junction point
7 block
8 block
9 block
10 block
11 block
12 block
13 junction point
14 junction point
15 PT1 filter
16 junction point
17 block
18 block
19 junction point
20 block
$f_{ref}$ reference frequency
$M(e)$ control torque
$M(i)$ present actual clutch torque
$M(k)$ correction torque
$M(s)$ target clutch torque
$n(g)$ transmission input speed
$V(c)$ control voltage
$Z_d$ rotational speed vector
$Z_k$ correction vector
$Z_m$ torque vector
$Z_{m1}$ output signal
$Z_p$ torque vector
$Z_s$ correction vector
$Z_t$ transformation vector

The invention claimed is:

1. A method for reducing chatter vibrations of a friction clutch controlled automatically by a clutch actuator based on a target clutch torque ($M(s)$) assigned to a clutch torque which is to be transmitted, said friction clutch is positioned in a drivetrain of a motor vehicle between an internal combustion engine and a transmission, having a present actual clutch torque which is marked by vibrations as a result of vibrations which occur occasionally ($M(i)$), the method comprising ascertaining an absolute amplitude and a phase of an input signal detected at output of the friction clutch from a transmission behavior of the present actual clutch torque ($M(i)$) and conveyed to a regulator, ascertaining a phase-selective disturbance torque from the absolute amplitude and the phase of the input signal determining a phase-correct correction torque ($M(k)$), and correcting a target clutch torque ($M(s)$) using the phase-correct correction torque by the regulator, and weighting the correction torque ($M(k)$) with a definable intensification factor.

2. The method according to claim 1, wherein the intensification factor is specified dependent on a value that is present within the method.

3. The method according to claim 1, wherein the intensification factor is specified dependent on a value that is specified outside the method.

4. The method according to claim 1, further comprising checking the input signal with regard to its regulating quality, and if quality is lacking the regulator is reset to an original state.

5. The method according to claim 1, further comprising making a determination of vibration components of the input signal, equidistant in a phase space of a reference frequency.

6. The method according to claim 5, further comprising depicting the vibration components in the form of vectors having an amplitude and a phase position in relation to the phase space, and the correction torque ($M(k)$) is ascertained on the basis of these.

7. The method according to claim 1, further comprising ascertaining a frequency response function of a changing transmission behavior from the target clutch torque ($M(s)$) and the present actual clutch torque ($M(i)$), and with changing transmission behavior providing a pre-control of the correction torque ($M(k)$) that depends thereon.

8. The method according to claim 1, further comprising correcting a phase shift dependent on detection of the input signal by a sensor.

9. The method according to claim 1, wherein the regulator is designed as an integral regulator and the correction torque ($M(k)$) is formed as a composite signal from an already issued phase-selective correction torque and a residual torque currently obtained from the input signal.

10. The method according to claim 1, wherein the phase-selective correction torque is formed phase-selectively opposite the residual torque by a time delay.

* * * * *